United States Patent
Esch et al.

(10) Patent No.: US 6,247,438 B1
(45) Date of Patent: Jun. 19, 2001

(54) INTAKE PIPE WITH SHIFT DRUM

(75) Inventors: Hans-Joachim Esch, Heimsheim; Rudolf Leipelt, Marbach; Holger Paffrath, Pulheim, all of (DE)

(73) Assignee: Filterwerk Mann & Hummel GmbH, Ludwigsburg (DE)

(*) Notice: Subject to any disclaimer, the term of this patent is extended or adjusted under 35 U.S.C. 154(b) by 0 days.

(21) Appl. No.: 09/529,831

(22) PCT Filed: Aug. 18, 1999

(86) PCT No.: PCT/EP99/06038

§ 371 Date: Jun. 20, 2000

§ 102(e) Date: Jun. 20, 2000

(87) PCT Pub. No.: WO00/11333

PCT Pub. Date: Mar. 2, 2000

(30) Foreign Application Priority Data

Aug. 20, 1998 (EP) .................................... 98115681

(51) Int. Cl.[7] .................................................. F02M 35/10
(52) U.S. Cl. .......................................................... 123/184.55
(58) Field of Search ........................................ 123/184.55

(56) References Cited

U.S. PATENT DOCUMENTS 5,156,117 * 10/1992 Müller et al. .................. 123/184.55

* cited by examiner

Primary Examiner—Noah P. Kamen
(74) Attorney, Agent, or Firm—Crowell & Moring, L.L.P.

(57) ABSTRACT

The invention relates to an intake pipe for the intake air of an internal combustion engine. The intake pipe comprises a shift drum which provides continuous adjustment of the intake pipe length. The intake pipe comprises a housing constructed of individual disks which are joined in a sealing manner via ring grooves. The shift drum is preferably made of regulator disks so that it can be assembled without difficulty by alternately sliding a housing disk and a regulator disk on to the drive shaft. The intake channels are sealed by means of sealing lips which are joined to the regulator disks, for example by injection, and are axially supported on annular ribs forming part of the housing disks. This makes it possible to compensate for the tolerances of all of the components. Apart form being easier to assemble, an intake pipe constructed in the above manner also has a lower weight since no inserts are required to configure and seal the individual intake channels.

10 Claims, 2 Drawing Sheets

INTAKE PIPE WITH SHIFT DRUM

BACKGROUND AND SUMMARY OF THE INVENTION

The invention relates to an intake pipe for the intake air of an internal combustion engine which comprises a shift drum for changing an intake duct length.

Intake pipes with shift drums are known, for example, as disclosed in German patent application 198 53 741.7. The construction principle for intake pipes, introduced in this application, designates a shift drum, which at the same time functions as a collection space for the intake pipe. Passages lead from the collection space into the intake ducts of the intake pipe. By rotating the shift drum, an infinitely variable adjustment is possible since the intake ducts are wound helically about the shift drum. Alternatively, several intake ducts are provided per cylinder and these can be switched on or off by rotating the shift drum.

Due to the accommodation of the collection space in the shift drum and the required minimum radius of curvature of the intake ducts, the dimensions of the shift drum are relatively large. The shift drum rotates in the intake pipe housing and participates in the formation of intake ducts, which must be sealed completely from one another and from the collection space. The large diameter of the shift drum results in relatively large sealing surfaces. In order to seal these from one another, relatively expensive seals are required. At the same time, the tolerance requirements for the components increase, since complete contact of the seals at the corresponding sealing surfaces is required. Since the shift drum must be sealed radially between the individual intake ducts, there are difficulties also during the installation because the seals must be handled over long installation movements.

In order to provide a remedy for the problems described, an intake pipe construction is proposed in the DE 197 56 332 A1, for which the shift drum, as well as the inserts of the intake pipe, forming the intake ducts, are subdivided into disk-shaped modules. The intake ducts are sealed between the respective modules which, for the installation of the intake pipe, are pushed consecutively (according to FIG. 2 of the document cited, alternately a plastic insert 15, 16 and an adjusting disk 19) into the intake pipe housing.

This solution decreases the sealing and tolerance problem. Before the installation, for example, L-shaped sealing washers 17 can be connected permanently with the adjusting disks 19. However, the inserts 15, 16 result in an additional constructional expense, which is reflected in increased manufacturing costs and, above all, in an increased weight of the component. However, internal combustion engines preferably are employed in mobile use, for which reason the weight aspect plays a large role.

It is therefore an object of the invention to provide an intake pipe, which is easily installed and operates reliably while weighing as little as possible.

In a known manner, the inventive intake pipe has a housing with an inlet and several outlets. The inlet can be connected with the intake tract, which contains the air filter. The outlets are at the ends of the intake ducts and can discharge, for example, into a cylinder head flange of an internal combustion engine. In the intake pipe, an adjustable shift drum is accommodated, which has a driving mechanism for this purpose. In the interior of the shift drum, there is the collection space of the intake pipe, which has passages, which are connected with the individual intake ducts. The intake ducts coil helically about the shift drum, so that an adjustment (especially rotation) of the shift drum leads to an angular shift of the passages and, with that, to an adjustment of the length of the intake pipe.

With that, the outer wall of the shift drum at the same time represents the inner radius of the intake ducts. The other walls of the intake ducts are formed partly or completely by wall elements, which are constructed disk-shaped, so that their parting lines are disposed perpendicularly to the axis of rotation of the shift drum.

The essential advantage of the inventive construction lies in the simultaneous use of the wall elements to form the outer wall of the housing of the intake pipe. In comparison to the construction of DE 197 56 332 A1, the whole of the housing body can thus be omitted in the region of the shift drum. The wall elements must be constructed so that they make it possible, at the same time, to seal the parting lines in such a manner, that the interior of the intake pipe is sealed completely from the surroundings. The wall elements can be combined with further housing parts, the omission of the additional housing leading to a reduction in weight.

According to a preferred embodiment of the present invention, the shift drum can also be divided into disk-shaped elements. During the installation of the intake pipe, these adjusting disks, together with the driving mechanism, are combined into an adjustable unit. In particular, the modular construction of the shift drum enables the module parts to be used for different numbers of cylinders, that is, also for different numbers of intake ducts of intake pipes. In addition, the installation process can be simplified in this manner, in that wall elements and adjusting disks are installed alternately, so that undercuts are also possible between these parts with respect to the installation direction. In this connection, it is particularly advantageous to support the shift drum in its axis of rotation on a shaft. The adjusting disks can then be pushed onto the shaft and, in this manner, are immediately centered. The adjusting disks are positioned with respect to one another as well as over sealing surfaces with respect to the adjusting disks. In order to be able to compensate better for tolerances, the hubs at the adjusting disks can be constructed spherically, so that these can wobble on the shaft. The wobbling movement is then determined by the tolerances, since the adjusting disks are guided by the sealing surface at the outer periphery with respect to the wall elements.

To form these sealing surfaces, the wall elements, pursuant to a special development of the invention, have an annular rib. They extend from the wall section of the wall elements, forming the housing, radially into the interior of the intake pipe and with that, considered as a component part, form the bottom of the perforated pot. With that, they close off the intake duct formed on one side. On the other side, the termination is formed by the annular rib of the adjacent wall element. In this way, the individual wall elements are shaped like a pot, it being possible to push the adjusting disk into the open side. In this connection, a particularly compact construction results if the wall elements described are connected directly behind one another. The annular ribs accordingly are used for separating adjacent intake ducts. A different possibility consists in an alternating installation of two different wall elements, one being provided to form the respective intake duct and the other for bridging an axial distance between the intake ducts.

Due to the alternating installation of adjusting disks and wall elements, these may have undercuts with respect to the installation direction. These undercuts can be used advantageously so that the annular ribs of the wall elements protrude into an annular gap, which results in each case between two adjacent adjusting disks. As a result, the possibility arises of providing sealing lips, which preferably act axially, between the inner edge of the annular ribs and the adjusting disks. Tolerances can be compensated for extremely well by the elasticity of the seal as well as by the wobbling capability of the adjusting disks. Due to the construction of the intake pipe, in each case two adjacent wall elements and the adjusting disk between them result in a unit with a defined geometry, tolerances arising only within this unit. By these means, chain tolerances are avoided, which arise when the adjusting disks with appropriate sealing devices are pushed into a one-piece intake pipe housing.

Pursuant to an advantageous embodiment of the invention, the housing is constructed of identical parts. At the same time, it is possible, in particular, to construct the wall elements identically. Two end parts are then required at the front ends of the intake pipe. It is advantageous if one of the end parts carries the inlet of the intake pipe and the other the driving mechanism for the shift drum, the axis of rotation of which passes through the center of the end part. Either the two end parts can be constructed differently or they can have an identical basic structure. Appropriate adapters are conceived for the driving mechanism and the intake tract of the internal combustion engine.

This construction is suitable for building up a modular system or intake pipes. On the one hand, there is a reduction in the number of individual parts needed, which preferably are produced by molding methods, so that fewer molding tools are required. In addition, the individual parts can be used for different intake pipes. In particular, due to the modular construction, intake pipes for different numbers of cylinders can be produced from the wall elements. Pursuant to an advantageous development of the inventive concept, pipe branches are provided at the wall elements, which are formed completely by the respective wall element. As a result, there are no additional costs for sealing the pipe branch from the other wall elements. The pipe branches are necessary in order to guide the intake duct out of the helical shape around the shift drum to the outlet on the cylinder side. This can be done either directly through the pipe branching or by swing pipe pieces, which can be fastened to the intake pipe housing, for example, with elastic pipe connecting sleeves.

The use of swing pipe pieces advantageously promotes the formation of a modular system. The basic structure of the intake pipe can be built up from the few identical parts described, the intake pipe end pieces having to be configured for the special application so as to make possible an adaptation of the basic structure of the intake pipe to the geometry of the corresponding internal combustion engine.

For connecting the wall elements to one another, it is advantageous to provide in adjacent wall elements an annular groove in one wall element and an installation shoulder in the other. For the assembly, the installation shoulder can be inserted into the annular groove, thus resulting in the sealed housing. In this connection, the sealing can be accomplished by an additional seal, which is inserted in the annular groove. It is, however, also possible that the seal comes about through the plug-in connection itself. This is achievable particularly when the wall elements are constructed from a plastic material, the elasticity of the annular groove being used in order to achieve a sealing effect in coordination with the installation shoulder.

The wall elements can be fixed by different assembly materials. For example, clip connections are conceivable, in which case the latches must be provided in one wall element and the corresponding recesses in the other. A different possibility is to bolt the individual wall elements together. Finally, these wall elements can also be glued together or welded (for example, by laser transmission welding), complete sealing being assured at the same time by this assembly procedure.

If identical parts are provided for the wall elements, then they must in each case have the annular groove on one side and the installation shoulder on the other. In this way, the wall elements can be plugged into one another to result in the desired housing.

The annular grooves and the installation shoulders must correspond to one another. However, this does not mean that they must necessarily be circular. However, a circular arrangement has the advantage that the wall elements may be inserted into one another at any angle, so that the angular position of the pipe branches to one another can be freely determined. This results in a further possibility of adapting the intake pipe to the existing geometric relationships of the internal combustion engine. If the cylinders are disposed in a row, a uniform arrangement of the pipe branches without an angular offset, for example, is advantageous. In a different, meaningful arrangement, the wall elements are offset in each case by 180°. If there is sufficient distance between the two rows of cylinders, such an intake pipe can be used, for example, for internal combustion engines with a V-shaped arrangement of cylinders.

A further advantageous application for the wall elements arises if, in addition to the intake ducts, resonance ducts are also to be formed in the intake pipe. By these means, an adjustment of the intake ducts in the intake pipe for utilizing the effect of the swing pipe supercharging, as well as an adjustment of the resonance ducts for utilizing resonance effects in the intake pipe can be realized. The objective of these measures is to optimize the rpm/torque behavior of the internal combustion engine. A possible structural development as well as the precise functioning principle of this combination intake pipe is given in the German patent application 198 37 773.8 (see, in particular, FIG. 9 with respect to the functioning principle and FIG. 1 with respect to the structure).

These and further distinguishing features of preferred further developments of the invention are evident from the claims, as well as from the specification and the drawings. The individual distinguishing features are realized in each case for themselves alone or in combination of several in the form of sub-combinations for the embodiment of the invention and can be realized in other fields and can represent advantageous embodiments, which are capable of being protected for themselves and for which protection is claimed here.

BRIEF DESCRIPTION OF THE DRAWINGS

Further details of the invention are described in the drawings by means of diagrammatic examples. In the drawings.

DETAILED DESCRIPTION OF THE DRAWINGS

Figure 1:
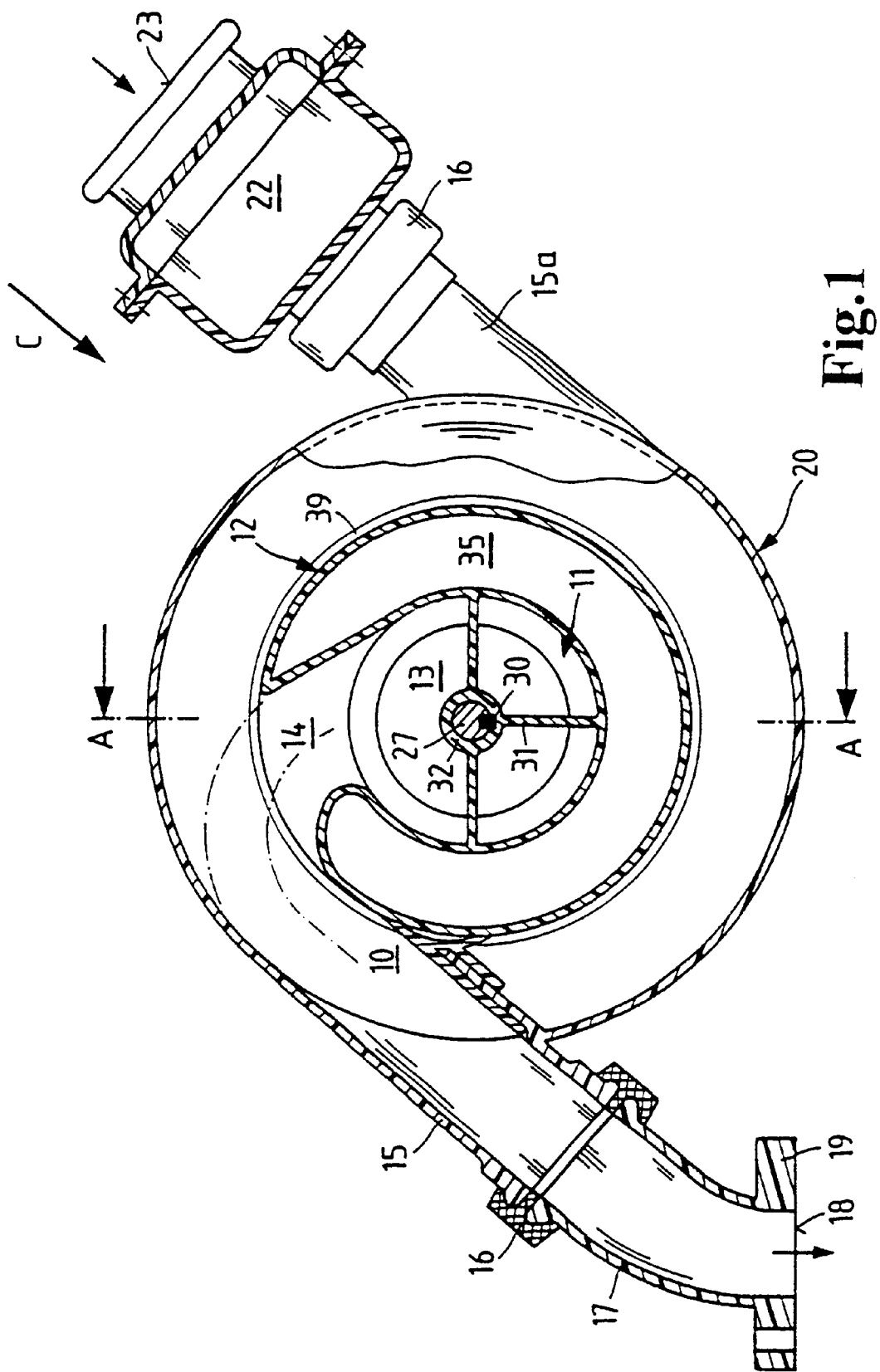
FIG. 1 shows a cross section through an inventive intake pipe, the sectional plane passing through one of the adjusting disks (sectional plane B—B of FIG. 2)

The path taken by the intake air through the intake pipe can be followed best in FIG. 1. The intake pipe is shown in cross section through one of the intake ducts 10. There is one collection space 11 in the interior of a shift drum 12 and is aligned basically perpendicularly to the plane of the Figure. The combustion air passes through an inlet 23 and pipe branches 15a into the collection space 11 and through a passage 14 to reach the intake duct 10. The intake duct discharges into a pipe branch 15, which is connected over an elastic decoupling element 16 with a swing pipe end piece 17. The swing pipe end piece 17 is provided with an outlet 18, which can be connected over a cylinder head flange 19 with an internal combustion engine, which is not shown. In the collection space 11, there is furthermore a resonance opening 13, which connects the two halves of the collection space and can be closed off by a circular stop plug, which is not shown.

A housing 20, in which the shift drum 12 is accommodated, furthermore has resonance ducts 21 (see FIG. 3), which discharge into pipe branches 15a. These pipe branches are connected over a further elastic decoupling element 16 with a resonance space 22, into which the inlet 23 discharges. Through the latter, the intake air is supplied to the intake pipe and, through the resonance ducts 21, which are not shown in FIG. 1, reaches the collection space 11. Rotating the shift drum brings about a change in the length of the intake ducts 10 as well as of the resonance ducts 21.

Figure 2:
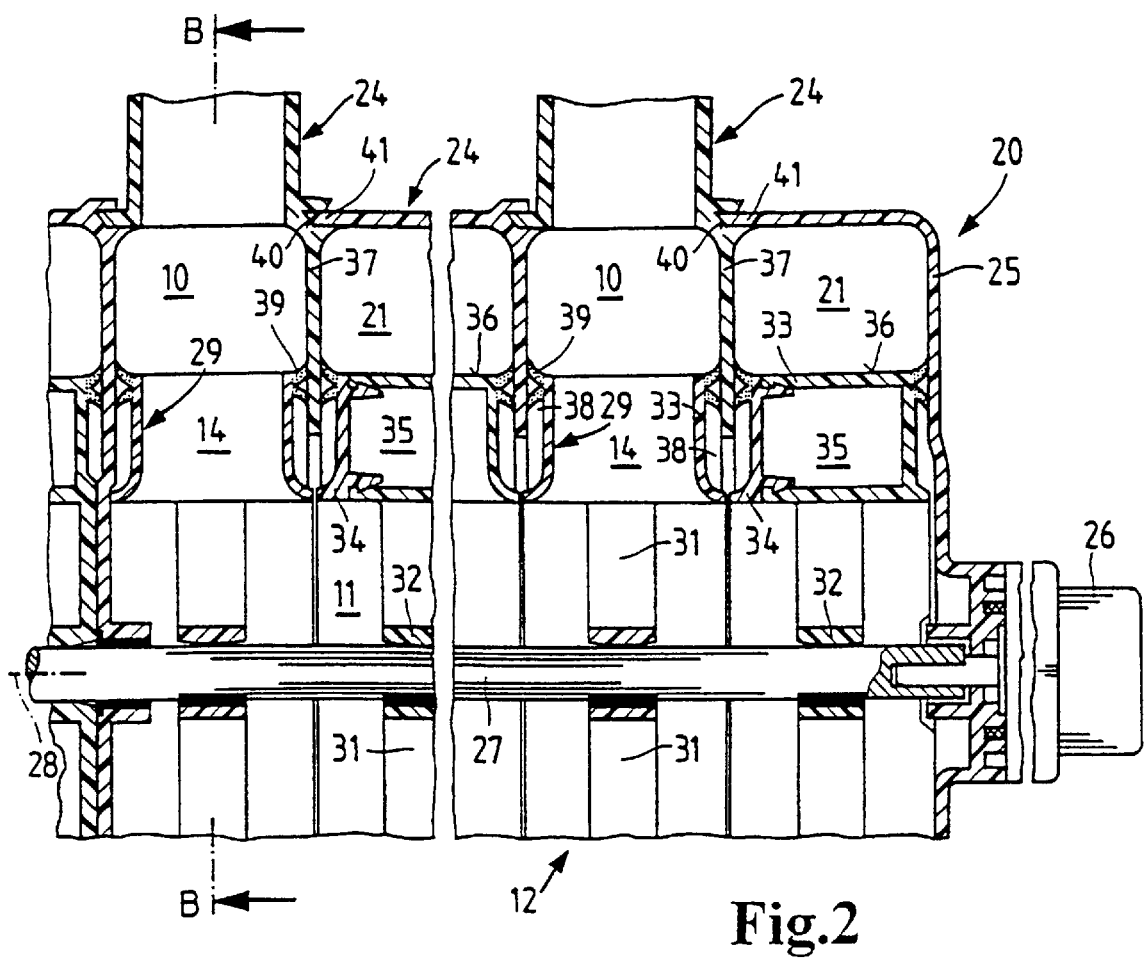
FIG. 2 shows the section A—A of FIG. 1.
Figure 3:
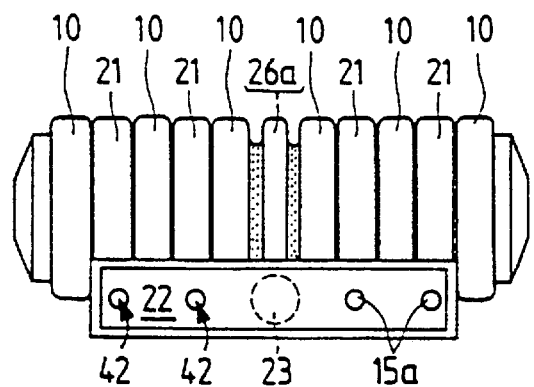
FIG. 3 shows a plan view of the housing of the intake pipe of FIGS. 1 and 2.

The structure of the intake pipe becomes clear from the longitudinal section shown in FIG. 2. The housing 20 consists of different wall elements. These can be divided into similar middle parts 24 and end parts 25, of which only the right one, which is provided with a driving mechanism 26, is shown. The end parts 25 and the middle parts 24 form the intake ducts 10 and the resonance ducts 21, which alternate with one another. If the intake pipe of FIG. 2 is compared with that of FIG. 3, the possibility of a modular construction of the intake pipe is seen. The intake pipe of FIG. 3 is intended for a six-cylinder internal combustion engine. In each case, two resonance ducts 21 and three intake ducts 10 are combined into a package with five ducts. The intake pipe of FIG. 2 is intended for a four-cylinder internal combustion engine, so that the outermost intake duct 10 is omitted and the end part 25 is used to form the first resonance duct 21. Connected to the driving mechanism 26 is a shaft 27, which passes through an axis of rotation 28 of the shift drum 12. The shift drum consists of individual adjusting disks 29, which are mounted circularly on the shaft 27. The torque is ensured from the shaft 27 to the adjusting disks 29 over an anti-rotation key connection 30 (see FIG. 1). The adjusting disks are connected over supporting ribs 31 with the spherical bearings 32. The supporting ribs permit the combustion air to be passed through the collection space.

The adjusting disks 29 are constructed in two parts. They consist of a basic structure 33 and a lid 34, these two parts forming a dead space 35 (see also FIG. 1). This dead space surrounds the collection space in annular fashion and ensures, on the one hand, that the collection space 11 does not have too large a cross section and, on the other, that the helically disposed intake ducts 10, because of the required limits to the flow losses, do not describe too small a radius. The passages 14 bridge the dead space 35 and connect the collection space 11 with the intake ducts 10 and the resonance ducts 21 respectively. The passage 14 is imaged completely in the basic structure 33 in order to avoid possible leaks. The basic structure can, for example, be injection molded from a synthetic resin by means of an appropriate hollow casting. The end parts 25 and the middle parts 24 are also preferably injection molded from a synthetic resin.

The inner curvature of the intake ducts 10 and the resonance ducts 21 is formed by the outer wall 36 of the individual adjusting disks 29, which belong to the shift drum 12. The side walls of the intake ducts 10 and the resonance ducts 21 are formed by the side wall of the end part 25 and of the annular ribs 37 respectively, which are part of the middle parts 24 and protrude radially inward into the cylindrical housing space. An annular gap 38, into which the annular ribs 37 protrude, remains between the adjusting disks 29.

For sealing the resonance ducts 21 and the intake ducts 10 respectively from one another and from the collection space 11, sealing lips 39, which expand axially in the annular gap 38 and lie against the radial ribs 37, are provided at the adjusting disks 29. The sealing lips can be gated to the adjusting disks 29 by a two-component technique. Elastomers, which adhere to the material of the adjusting disks, come into consideration, for example, for sealing materials. For connecting the middle parts 24 with one another or to the end parts 25, an annular groove 40 and an installation shoulder 41 are provided at each middle part. The individual wall elements are joined together by way of this connection. The fixing can be carried out, for example, after the installation by laser welding. Alternatively, a clip connection would also be possible but is not shown. Compared to the annular groove 40, the installation shoulders 41 are overdimensioned so that, by inserting one into the other, the intake housing at the same time is sealed.

In FIG. 3, view C of FIG. 1 is shown as a view of an intake pipe with 6 intake ducts 10 and four resonance ducts 21. The resonance space is shown without a lid, the inlet 23 being indicated by a broken line. Openings 42 lead from the resonance space into the pipe branches 15a, which are behind the resonance space 22. These lead into the resonance ducts 21, which lead to the collection space, which cannot be seen. From there, the intake air is supplied to the intake ducts 10, from which it is passed into the pipe branches 15 behind the intake pipe housing. The driving mechanism 26a is disposed between the two blocks consisting of the intake ducts 10 and the resonance ducts 21.

What is claimed is:

1. An intake pipe for intake air of an internal combustion engine comprising:

a housing comprising an inlet and outlets;

a shift drum which is adjustable by a driving mechanism and in which a collection space is integrated, the shift drum being provided with passages from the collection space to individual intake ducts;

the intake ducts being helically disposed and leading from the collection space to the outlets, the intake ducts being formed partially by interconnectable wall elements and partially by an outer wall of the shift drum, parting lines of the interconnectable wall elements being disposed perpendicularly to an axis of rotation of the shift drum;

wherein the interconnectable wall elements which form the intake ducts simultaneously at least partially form the housing and are sealed therebetween when connected with one another.

2. The intake pipe of claim 1, wherein the shift drum is formed from adjusting disks which, together with the driving mechanism, form an adjustable unit.

3. The intake pipe of claim 2, wherein at least a part of the wall elements has an annular rib which closes off the intake duct formed on one side in an axial direction of the intake pipe, and wherein another axial termination of the intake duct is formed by another annular rib by an adjacent wall element, and seals, which permit rotation of the adjusting disks, are provided between the annular ribs and each respective adjusting disk.

4. The intake pipe of claim 3, wherein the seals comprises sealing lips which are accommodated in an annular gap between the annular ribs and the adjusting disks.

5. The intake pipe of claim 1, wherein the shift drum is supported in its axis of rotation on a shaft.

6. The intake pipe of claim 1, wherein the housing is built up at least partially from identical wall elements including two end parts and identical middle parts.

7. The intake pipe of claim 1, wherein pipe branches are provided which communicate with the outlets and are each integrated completely in a respective wall element of the intake duct.

8. The intake pipe of claim 1, wherein the connection of the wall elements with one another comprises an annular groove in one wall element and an installation shoulder in the other wall element.

9. The intake pipe of claim 1, wherein the connection of the wall elements with one another is constructed circularly.

10. The intake pipe of claim 1, wherein intake ducts and resonator ducts are formed by the wall elements.

* * * * *